W. H. LETZ.
CLUTCH MECHANISM FOR CORN PLANTERS.
APPLICATION FILED JULY 12, 1915.
1,238,157. Patented Aug. 28, 1917.
4 SHEETS—SHEET 1.
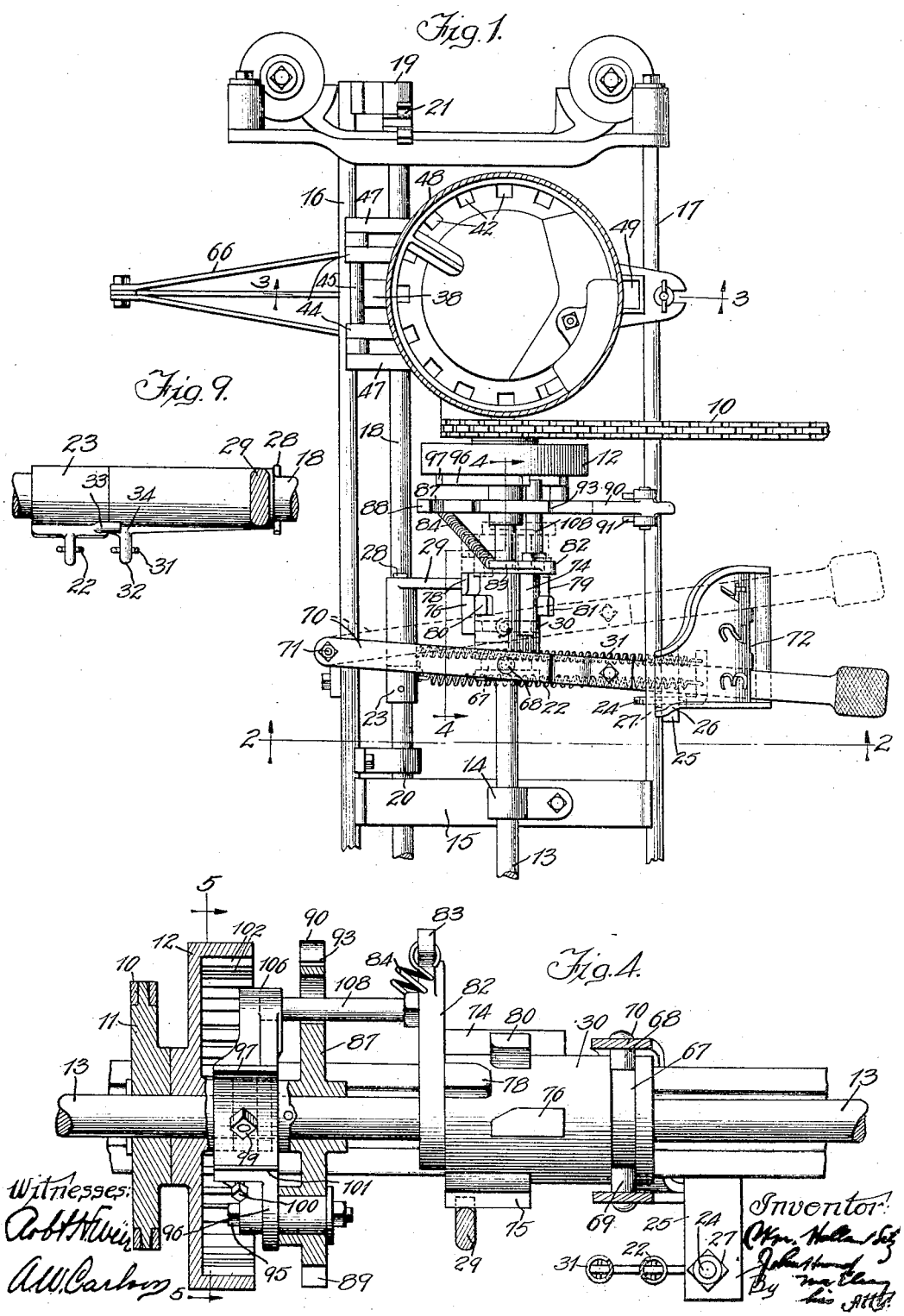

W. H. LETZ.
CLUTCH MECHANISM FOR CORN PLANTERS.
APPLICATION FILED JULY 12, 1915.
1,238,157.
Patented Aug. 28, 1917.
4 SHEETS—SHEET 2.
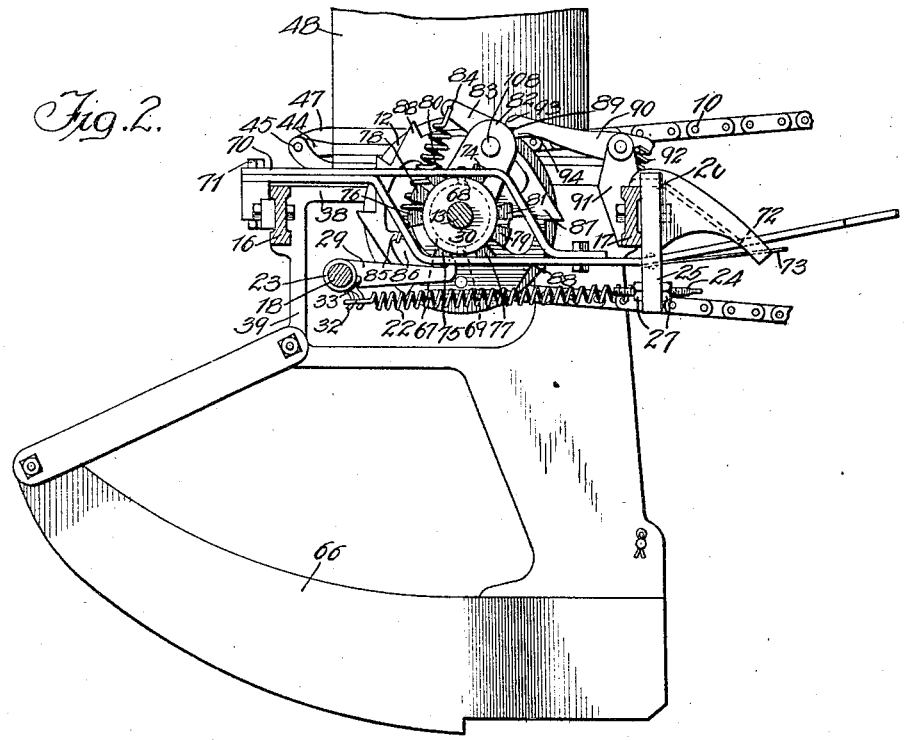
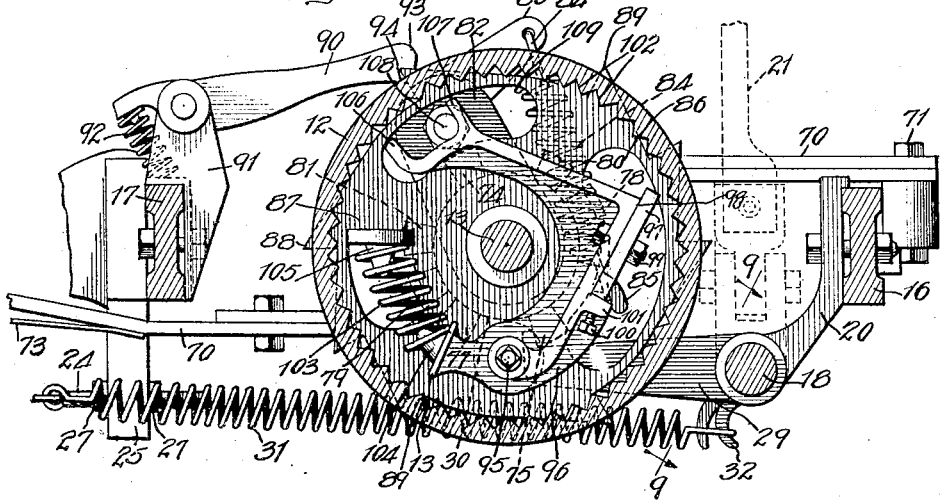
Witnesses:
Robert H Weir
Arthur W. Carlson
Inventor:
William Holland Letz
By John Howard McElroy
his Atty.

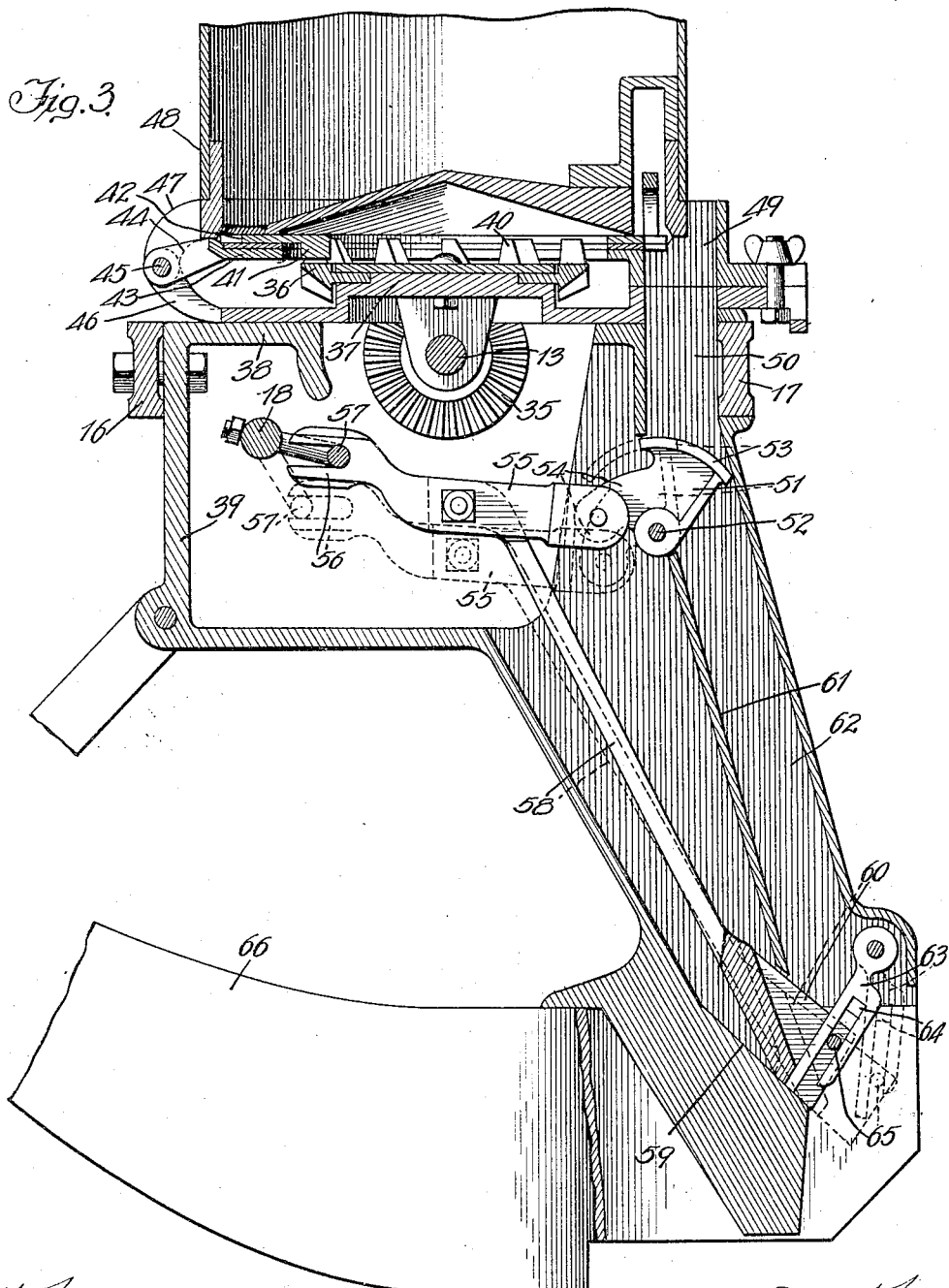

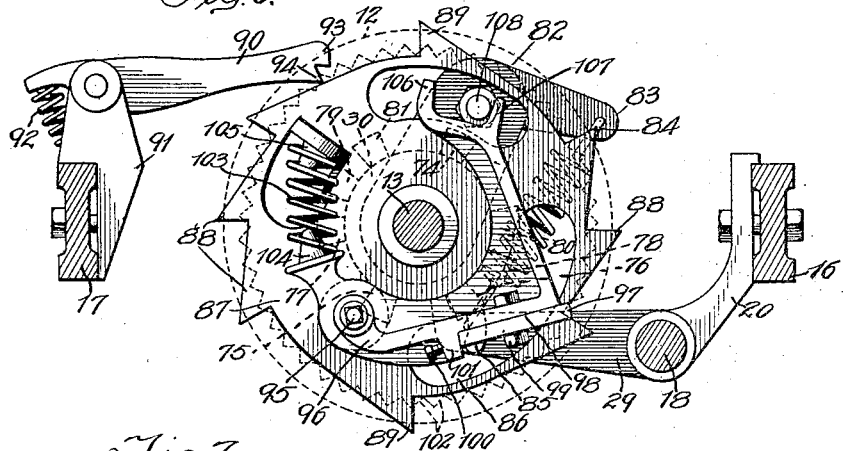

UNITED STATES PATENT OFFICE.

WILLIAM HOLLAND LETZ, OF CROWN POINT, INDIANA, ASSIGNOR TO THE LETZ MANUFACTURING COMPANY, OF CROWN POINT, INDIANA, A CORPORATION OF INDIANA.

CLUTCH MECHANISM FOR CORN-PLANTERS.

1,238,157.    Specification of Letters Patent.    Patented Aug. 28, 1917.

Application filed July 12, 1915. Serial No. 39,228.

*To all whom it may concern:*

Be it known that I, WILLIAM HOLLAND LETZ, a citizen of the United States, and a resident of Crown Point, in the State of Indiana, have invented certain new and useful Improvements in Clutch Mechanisms for Corn-Planters, of which the following is a full, clear, and exact specification.

My invention is concerned with the clutch mechanism employed in dropping mechanism for corn planters, and more especially with dropping mechanism of the type that can be adjusted to vary the number of grains dropped for each hill, and is designed to produce a mechanism of the class described that shall be simple in its construction, capable of being cheaply manufactured, and which shall be accurate and certain in its operation. To these ends, it consists in certain novel elements and combinations of elements, which will be fully described in the specification, and the novel features and combinations particularly pointed out in the claims.

To illustrate my invention, I annex hereto four sheets of drawings, in which the same reference characters are used to designate identical parts in all the figures, of which,—

Figure 1 is a top plan view of one end of the runner frame of a corn planter embodying my invention, with the upper portion of the seed box removed and in horizontal section;

Fig. 2 is a section on the line 2—2 of Fig. 1;

Fig. 3 is a section on the line 3—3 of Fig. 1, but on an enlarged scale;

Fig. 4 is a section on the line 4—4 of Fig. 1, but also on an enlarged scale;

Fig. 5 is a section on the line 5—5 of Fig. 4;

Fig. 6 is a view similar to Fig. 5, but with the rim of the driving cup omitted and its position indicated in dotted lines, and with the parts in operating position, the parts in Fig. 5 being shown in the inoperative position in which the seed shaft is at rest;

Fig. 7 is a view similar to Fig. 6, but with the parts at the position they assume just prior to the disengagement of the clutch dog from the driving cup to stop the rotation of the seed shaft;

Fig. 8 is a plan view of the periphery of the stop sleeve extended; and

Fig. 9 is a detail in section on the line 9—9 of Fig. 5.

The runner frame, one end of which is shown in Fig. 1, will of course be suitably connected to the main frame, and a sprocket wheel on the shaft of the main frame or one of the covering wheels will be connected by the sprocket chain 10 with the sprocket wheel or pinion 11 rigidly secured on the hub of the driving cup 12, which is loosely mounted on the seed shaft 13, which is journaled in suitable bearings 14 secured to the upper side of brackets 15 which are located at suitable intervals between the longitudinal bars 16 and 17 making up the body of the runner frame. The rock shaft 18, extending parallel to the seed shaft 13, is likewise journaled in suitable bearings 19 and 20 extending inward and downward from and secured to the rear side of the bar 16. This rock shaft has secured on its outer ends the forks 21, which are adapted to be actuated at each hill by the buttons on the customary check-row wire to rock the shaft 18 against the tension of the helically-coiled contractile spring 22, one end of which is secured to the short arm projecting from the collar 23 pinned on the rock shaft, while the other end is secured to the angular arm 24, which has one end threaded and passed through a downwardly extending arm 25 of a bracket 26 which is bolted to the bar 17. A pair of lock nuts 27 placed on either side of the arm 26 enables me to adjust the position of the arm 24, and thus regulate the tension of the spring 22. Journaled on the rock shaft 18 between the collar 23 and the cotter pin 28 is the hub of the hook-shaped stop dog 29, the nose of which is normally held in engagement with the periphery of the stop sleeve 30 mounted on the seed shaft 13 and constructed in a manner to be subsequently described. This engagement of the nose of the stop dog 29 with the periphery of the sleeve 30 is effected by a second helically-coiled contractile spring 31 similar to the spring 22, and having one end connected to the same arm 24, while the other end is connected to the lug 32 extending downwardly from the hub of the stop dog 29. When the rock shaft 18 is rocked against the tension of the spring 22 by the action of the buttons on the check-row wire on the fork 21, it carries with it the stop dog 29 by reason of the engagement of the lug 33 on the collar 23 with the projection 34 on the hub of the stop dog 29, and by the connections to be subsequently described, the seed shaft 13 is then coupled to the driving cup 12 so as to be rotated thereby. As best seen in Fig. 3, the seed shaft 13 has secured thereon a bevel-gear pinion 35 meshing with a bevel-gear annulus 36 which is journaled on a bearing plate 37, which is bolted or otherwise rigidly secured to the horizontal top 38 of the runner casting 39. The upper surface of the annulus 36 has formed thereon twelve teeth 40, some of which engage the downwardly projecting lugs 41 on the under surface of the seed plate 42, which rotates on a suitable annular bearing formed on the upper surface of the annulus 43, which is pivotally connected by the arms 44 journaled on the pivot pin 45 mounted in the arms 46 carried by the bearing plate 37 previously referred to. Similarly pivoted on the pin 43 by the arms 47 is the seed box 48, which is provided with any suitable guiding mechanism for insuring the filling of the recesses of the seed plate by the corn as the seed plate is rotated to bring the grains one by one to the top 49 of the discharge chute 50, into which the grains of corn are delivered. The body of this discharge chute 50 is formed in the top of the runner casting 39, and at a point slightly below the seed shaft 13 the passage is ordinarily closed by the valve 51 pivoted at 52 in the runner casting 39. This valve 51 has a circular flange 53, which actually closes the passage, and an arm 54 to which is pivoted the bar 55 having the forked outer end 56, which is engaged by the bail 57, the ends of which are passed through and secured to the rock shaft 18. The bar 55 has rigidly secured to the central portion thereof the plunger 58, the bottom end of which slides on the inclined bearing 59 formed in the runner casting 39. The bottom of the plunger 58 is enlarged and has a channel 60 formed therein, with the bottom of the channel substantially parallel to the web 61 in the runner casting, which web forms the forward side of the inclined extension 62 of the chute 50. Pivoted in the casting at the bottom of the chute is a valve 63, which enters the channel 60 and has a slot 64 therein through which extends the pin 65 connecting the walls of the channel 60, and thus making a pivotal connection between the channeled end of the plunger and the valve 63, so that when the plunger is in its uppermost full-line position, the grains of corn will be held in the pocket formed by the channel 60 and the valve 63, but when it descends to its lowermost position, indicated in dotted lines, by reason of the rocking of the shaft 18, the grains of corn actually in the pocket will be discharged into the furrow formed by the runner blade 66.

Returning now to the stop sleeve 30 and its connections to the driving cup 12, I will explain the construction of the sleeve and connections whereby the machine can be arranged to drop two, three or four grains of corn in each hill, as may be desired. As is best shown in Figs. 1 and 4, the sleeve 30 has the annular channel 67 therein, which is engaged by the pins 68 and 69 extending downwardly and upwardly, respectively, from the loop formed in the foot lever 70 pivoted at 71 to the bar 16. The free end of the foot lever 70 extends beneath the bar 17 and through a horizontal slot 72 formed in the bracket 26, and provided in its upper edge with three recesses to engage and hold the foot lever by reason of the tension of the leaf spring 73, shown in Fig. 5, in whichever one of the three recesses or positions may be selected. As is seen in Fig. 1, the lowermost recess is marked 3, the middle one 2, and the uppermost one 4, and it will be understood that when the foot lever is adjusted in these various positions, the dropping mechanism will deliver three, two or four grains to each hill. The stop sleeve 30 is loosely mounted on the seed shaft 13, and as the foot lever 70 is shifted, the sleeve 30 moves with it to bring the three different rows of lugs into the vertical plane of the nose of the stop dog 29. As best seen in Fig. 8, the stop sleeve 30 has projecting radially from the surface thereof eight teeth 74, 75, 76, 77, 78, 79, 80 and 81, which are of the shape and dimensions clearly shown in said figure. When the foot lever is in the full-line position shown in Fig. 1, the nose of the stop dog 29 is in the plane of the row of four stops formed by the upper ends of the lugs 74 and 75 and by the lugs 78 and 79. This means that by the mechanism to be subsequently described the shaft 13 will be rotated only one quarter of a turn each time it is set in motion with the stop sleeve 30 thus adjusted, and as twelve grains of corn are delivered by each complete rotation of the seed shaft, there will be only three grains of corn delivered at each hill. When the foot lever 70 is shifted to the dotted-line position shown in Fig. 1, the nose of the stop dog 29 is in the plane of the three stops formed by the lower ends of the lugs 74, 76 and 77, and with this arrangement, the shaft 13 being given one-third of a complete rotation at each hill, there will be four grains delivered. In the intermediate position, the nose of the stop dog 29 will be in the plane of the six stops formed by the middle of the lug 74, the lower end of the lug 75, the upper ends of the lugs 76 and 77, and the lugs 80 and 81, and as with this arrangement the seed shaft can be given only one-sixth of a rotation for each hill, only two grains of corn will be discharged in a hill.

The connections between the stop sleeve 30 and the seed cup 12 are as follows:

Rigidly secured on the adjacent end of the stop sleeve 30 is an arm 82, which has a projection 83 extending from the outer end thereof, and serving as a support for one end of the strong helically-coiled contractile spring 84, the other end of which is connected to a hook 85 formed in a recess 86 in the ratchet disk 87, the hub of which is pinned to the seed shaft 13, so that the seed shaft is compelled to move with the ratchet disk 87. This ratchet disk might have on its periphery twelve teeth of the length of the four teeth 88 shown, but, in order to eliminate friction, I preferably omit four teeth and employ four of the short teeth 88 and four of the long teeth 89, these teeth being arranged as best shown in Figs. 6 and 7, and being adapted to be engaged by the pawl 90, which is pivoted in the bearing bracket 91 secured on the bar 17, and having the spring 92 interposed between it and the frame so as to hold the dog always in operative position and supplement the action of gravity. As a means of insuring the operation of the pawl 90, I preferably form it with two points 93 and 94. Pivoted on the ratchet disk 87, as by the bolt 95, is the clutch dog 96, which has its operating nose 97 preferably formed by a hardened steel plate having an elongated slot in the center thereof and secured upon a seat 98 formed on the dog 96 by the bolt and nut 99. To regulate to a nicety the position of the nose of the dog and take up wear, I pass the set screw 100 through the lug 101 formed on the dog 96, and by turning the set screw 100, the position of the plate 97 can be adjusted as desired, and secured in the desired adjustment by the nut and bolt 99. By using this rectangular piece of metal and hardening it, I am enabled to make a dog that will wear almost indefinitely, as when it has become worn, it can be turned over or turned end for end, or both, and in this manner four wearing points are provided. The square points thus formed coöperate with the similar teeth 102 formed on the inner periphery of the driving cup 12, as best seen in Fig. 5. A helically-coiled expansible spring 103 is interposed between a lug 104 formed on the tail of the dog 96, and a lug 105 formed on the ratchet disk 87. As seen in Figs. 5, 6 and 7, the general shape of the dog 96 is angular, the dog being pivoted at one end, the engaging nose being at the angle, and the other end being formed with a pair of lugs 106 and 107. These lugs are separated by a space through which plays the end of a pin 108 projecting through an aperture 109 in the ratchet disk 87 and rigidly secured to the arm 82. It will be noted that the spring 84 tends to pull the stop sleeve 30 along with the ratchet disk 87, which is secured on the shaft 13, and it will be noted further that the connections and location of this spring are such that it is possible to slide the stop sleeve 30 along the seed shaft 13 in the manner heretofore described without disengaging the spring or interfering with its operation.

In describing the operation of the machine, I will assume that the clutch is operating, the parts then being as seen in Fig. 6, in which case the nose of the stop dog 29 is at some point between the two adjacent lugs on the stop sleeve 30, one of which lugs is approaching the said nose. During this movement, the teeth 102 of the driving cup 12 are engaged by the nose 97 of the clutch dog 96 pivoted on the ratchet disk 87, so that the rotation of the cup carries with it the ratchet disk 87, and also the seed shaft 13 upon which the hub of the ratchet disk is pinned. The connecting spring 84, one end of which is connected to the ratchet disk 87 and the other to the arm 82 on the stop sleeve 30, draws the latter with the former until the nose of the stop dog 29 is engaged by the advancing lug on the stop sleeve 30, which then necessarily stops. The motion of the ratchet disk 87, however, continues, putting the spring 84 under tension, but the pin 108 carried by the arm 82 on the stop sleeve 30, which has been in engagement with the forward lug 107 on the clutch dog 96, now stops, and the continued movement of the ratchet disk 87, and the clutch dog 96 pivoted thereon, carries the forward lug 107 away from the pin 108, which is finally engaged by the rear lug 106. Just prior to this engagement, the proper tooth, 88 or 89, as the case may be, on the ratchet disk 87, is engaged by the pawl 90, the position of the parts then being as illustrated in Fig. 7; and when the pin 108 stops the movement of the lugs of the clutch dog 96 and causes it to swing on its pivot 95 and release its nose 97 from the teeth 102 of the driving cup 12, the spring 84, now under increased tension, cannot pull the ratchet disk 87 back and allow the nose 97 of the clutch dog 96 to reengage the teeth 102. Consequently, the stop sleeve 30, the ratchet disk 87, the seed shaft 13 and the clutch dog 96 are all held stationary while the driving cup continues its movement, the position of the parts now being those shown in Fig. 5. This continues until the next button on the check-row wire strikes the fork 21 and swings the rock shaft 18 so as to disengage the nose of the stop dog 29 from the lug on the stop sleeve 30 with which it is then in engagement. As soon as the stop dog 29 is moved sufficiently to disengage its nose from the lug, the spring 84, which has been under increased tension, jerks the stop sleeve 30 forward a trifle so that the nose of the stop dog 29, as it returns to normal position, strikes on the outer surface of the stop lug, and the pin 108 having engaged the forward lug 107 on the clutch dog 96, swings the nose 97 of the dog into engagement with the teeth 102 of the driving cup 12, and the movement of the seed shaft 13 begins again, and continues until the nose of the stop dog 29 engages the next lug on the stop sleeve 30, when the action just described is repeated, and so on. By reference to Figs. 6 and 7, it will be apparent that as the nose or contact piece 97 is adjusted longitudinally by the screws 99 and 100, the relative positions, at any instant, of the teeth 102, the pin 108, and the lug 106 will be varied. As the dog 90 engages the teeth 88 or 89, as the case may be, and holds the disk 87, and consequently the shaft 13, from backward movement before the pin 108 is engaged by the shoulder 106 to effect the disengagement of the nose 97 from the teeth 102, the longitudinal adjustment of the nose 97 controls to a nicety the lost motion between the pin 108 and the shoulder 106, after the ratchet dog 90 engages the ratchet tooth and prevents the disk 87, and consequently the shaft 13, being possibly thrown too far forward, thus discharging a grain more than the machine was set for, and being held in the too far advanced position by the point 93, instead of the point 94.

If it is desired to use the planter for drilling, a suitable foot lever and connections to the rock shaft 18 will be provided, by which said shaft can be rocked far enough to carry the nose of the stop dog 29 permanently out of engagement with the lugs on the stop sleeve 30, so that the seed shaft 13 will be rotated continuously. When the rock shaft 18 is held in this position, the valves 53 and 63 in the runner are held open, and the grains of corn can fall in place as soon as they are delivered from the seed plate. When the machine is being used as a check-rower and it is desired to change the number of grains to the hill, as is sometimes done in passing from poor land to better land, and vice versa, the operator, by moving the foot lever 70, is enabled to make the change without stopping the machine. As the nose of the stop dog 29 is in engagement with the periphery of the stop dog 30, and it has to pass from one extreme position to the other, the stop lugs 76, 78, 79 and 81 have their corners beveled off, as shown, in order to make a passage for the nose of the dog in spite of the fact that the operative faces of these lugs are closer together than the thickness of the nose.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a device of the class described, a stop sleeve having a plural series of radially arranged stop lugs thereon, the angular distance between which regulates the angular movement of the stop sleeve, the lugs of each series being separated by different angular distances, and some of the lugs having their corners beveled off, for the purpose described.

2. In a device of the class described, the combination with a shaft, of a stop sleeve slidingly mounted thereon having plural series of stop lugs thereon, the angular distances between which regulate the angular movement of the sleeve at each dropping action, each series being separated by different angular distances, a stop dog movable to and from the stop sleeve and having its nose normally engaging the periphery of the sleeve between the lugs, and means for shifting the sleeve longitudinally of the shaft, some of the stop lugs having their corners beveled off, for the purpose described.

3. In a device of the class described, the combination with a driven shaft, of a sprocket wheel loose on the driven shaft, a sprocket chain driving the sprocket wheel, a parallel rock-shaft adjacent the driven shaft, a driving clutch member secured on the sprocket wheel on the driven shaft, a detent member rigidly fastened on the driven shaft, a driven clutch member pivoted on the detent element and adapted to engage the driving clutch member, a stop member loosely and slidingly mounted on the driven shaft and provided with plural series of stop surfaces, the angular distance between which regulates the angular movement of the driven shaft at each dropping action, each series of stop surfaces being separated by different angular distances, yielding connections between the detent element and the stop member causing the latter to drive the former, a stop dog secured on the rock shaft and movable thereby to and from the stop member, connections between the stop member and driven clutch member to disengage the latter from the driving clutch member when the stop member ceases to rotate, said connections operating automatically to reëngage them when the stop member is released from the stop dog, means for rocking the shaft to disengage the dog from the stop surfaces, and means for sliding the stop member on the driven shaft to determine which series of the stop surfaces shall be operative.

4. In a device of the class described, the combination with a driven shaft, of a sprocket wheel loose on the driven shaft, a sprocket chain driving the sprocket wheel, a parallel rock-shaft adjacent the driven shaft, a driving clutch member secured on the sprocket wheel on the driven shaft, a detent member rigidly fastened on the driven shaft, a driven clutch member pivoted on the detent element and adapted to engage the driving clutch member, a stop member loosely and slidingly mounted on the driven shaft and provided with plural series of stop surfaces, the angular distance between which regulates the angular movement of the driven shaft at each dropping action, each series of stop surfaces being separated by different angular distances, yielding connections between the detent element and the stop member causing the latter to drive the former, a stop dog secured on the rock shaft and movable thereby to and from the stop member, connections between the stop member and driven clutch member to disengage the latter from the driving clutch member when the stop member ceases to rotate, said connections operating automatically to reëngage them when the stop member is released from the stop dog, means for rocking the shaft to disengage the dog from the stop surfaces, and means for sliding the stop member on the driven shaft to determine which series of the stop surfaces shall be operative, said means consisting of a foot lever pivoted in advance of the driven shaft and extending rearwardly past the same, and having a pin extending into an annular channel in the stop member, and means for securing the lever in its chosen adjustment.

5. In a device of the class described, the combination with a driven shaft, of a sprocket wheel loose on the driven shaft, a sprocket chain driving the sprocket wheel, a parallel rock-shaft adjacent to the driven shaft, a driving clutch member secured on the sprocket wheel, a driven clutch member secured on the driven shaft but movable into and out of engagement with the driving clutch member, a suitable member loosely and slidingly mounted on the driven shaft and provided with plural series of stop surfaces, the angular distance between which regulates the angular movement of the driven shaft at each dropping action, each series being separated by different angular distances, yielding connections between the driven clutch member and the stop member causing the driven clutch member to drive the stop member, a dog secured on the rock shaft engaging the stop surfaces on the stop member, connections between the stop member and the driven clutch member to disengage the latter from the driving clutch member when the stop member ceases to rotate, said connections operating automatically to reëngage them when the stop member is released, means for sliding the stop member on the driven shaft to determine which series of stop surfaces shall be operative, means for securing the stop member in its chosen adjustment, and means for rocking the shaft to disengage the dog from the stop surfaces.

6. In a device of the class described, the combination with a driven shaft, of a pair of clutch members mounted thereon, one being rigidly connected thereto, said clutch members being provided, one with teeth, and the other with a dog pivotally mounted thereon, a tooth-engaging nose-piece carried by the dog, means for longitudinally adjusting the nose-piece on the dog and securing it in any adjustment, a tripping pin, free to rotate about the shaft as a center, an abutment carried by the dog and engaging the pin to swing the dog to disengage the clutch members, means for positively stopping the movement of the pin relative to the shaft, and means for preventing backward movement of the clutch member on which the dog is pivoted, the longitudinal adjustment of the nose-piece serving to regulate to a nicety the angular position in, which the shaft stops.

In witness whereof, I have hereunto set my hand and affixed my seal, this 8th day of July, A. D. 1915.

WILLIAM HOLLAND LETZ. [L. S.]

Witness:
JOHN HOWARD MCELROY.